US008503665B1

(12) United States Patent
Meisel

(10) Patent No.: US 8,503,665 B1
(45) Date of Patent: Aug. 6, 2013

(54) SYSTEM AND METHOD OF WRITING AND USING SCRIPTS IN AUTOMATED, SPEECH-BASED CALLER INTERACTIONS

(76) Inventor: William S. Meisel, Tarzana, CA (US)

( * ) Notice: Subject to any disclaimer, the term of this patent is extended or adjusted under 35 U.S.C. 154(b) by 1314 days.

(21) Appl. No.: 12/105,153

(22) Filed: Apr. 17, 2008

Related U.S. Application Data

(60) Provisional application No. 60/912,562, filed on Apr. 18, 2007, provisional application No. 60/912,572, filed on Apr. 18, 2007, provisional application No. 60/912,570, filed on Apr. 18, 2007, provisional application No. 60/969,065, filed on Aug. 30, 2007.

(51) Int. Cl.

| | |
|---|---|
| ***H04M 3/00*** | (2006.01) |
| ***H04M 5/00*** | (2006.01) |
| ***G06F 9/455*** | (2006.01) |
| ***G10L 11/00*** | (2006.01) |

(52) U.S. Cl.
USPC .................. 379/266.07; 379/265.02; 703/26; 704/270; 704/270.1

(58) Field of Classification Search
USPC ........... 379/67.1, 88.01, 242, 265.01, 265.11, 379/266.07, 88.18, 265.02, 265.09, 265.13; 704/270, 270.1, 275; 703/26
See application file for complete search history.

(56) References Cited

U.S. PATENT DOCUMENTS

| | | | | |
|---|---|---|---|---|
| 7,712,031 | B2 * | 5/2010 | Law et al. | 715/728 |
| 2003/0007609 | A1 * | 1/2003 | Yuen et al. | 379/88.16 |
| 2005/0091056 | A1 * | 4/2005 | Surace et al. | 704/270.1 |
| 2005/0152516 | A1 * | 7/2005 | Wang et al. | 379/88.22 |
| 2006/0206299 | A1 * | 9/2006 | Scholz et al. | 703/26 |
| 2007/0234279 | A1 * | 10/2007 | Brill et al. | 717/104 |

* cited by examiner

*Primary Examiner* — Khai N Nguyen
(74) *Attorney, Agent, or Firm* — Fish & Richardson P.C.

(57) ABSTRACT

A machine-implemented method includes enabling a script writer to enter a line of dialog for use by a call center in a connection with a machine-implemented, speech-based, caller-interaction, assigning a line type to the line of dialog, determining, based on the assigned line type, information to incorporate the line into the user-interaction and enabling the script writer to provide the information anytime after the line is entered, and, an integrated database and delivery system that can automatically make the results available to callers.

16 Claims, 9 Drawing Sheets

304a — INTRODUCTION ⎯ 306a
How can I help you?
Tell me a joke. ⎯ 308a
<Go to JOKE 1>
312a ∘
∘
∘

JOKE 1:
304b OK. I have a lot of complaints and some people consider them funny. Would you like to hear ⎯ 306b
about my problems? ⎯ 306c
No. ⎯ 308b
[Plaintively.] You don't want to hear my complaints? Last chance! ⎯ 306d
310 OK, go ahead. ⎯ 308c
My first complaint is about indecisive callers like you. It takes a lot of electrons if I have to ask
a question twice. Haven't you heard about global warming?
304c ∘
∘

OFFER FOR SALE 1
So, Would you like to purchase a product? ⎯ 306e
Yes.
What kind of product are you interested in? A book or a music CD? ⎯ 306f
A book. ⎯ 308e
<Go to BUY BOOK>
312b ∘
304d ∘
BUY BOOK

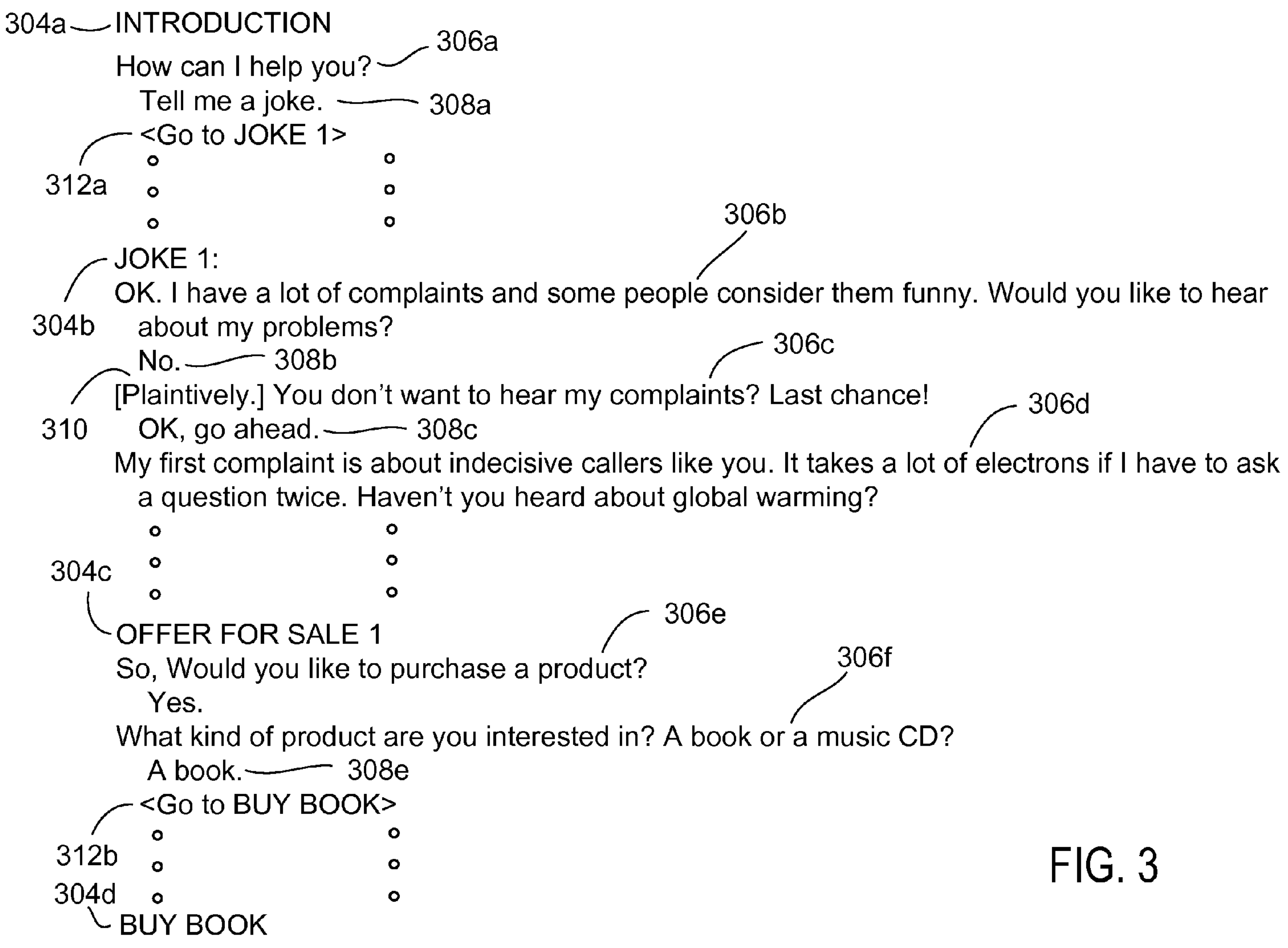

FIG. 3

[The system voice is male, initially very formal.]
System: How can I help you?
Caller: Tell a joke.
JOKE 1:
System: OK. I have a lot of complaints and some people consider them funny. Would you like to hear about my problems?
Caller: No.
System: (Plaintively.) You don’t want to hear my complaints? Last chance!
Caller: OK, go ahead.
System: My first complaint is about indecisive callers like you. It takes a lot of electrons if I have to ask a question twice. Haven’t you heard about global warming

FIG. 4

Joe: I'm insulted.
Cindy: How can you be insulted? You're a computer. How can I help you?
Caller: Tell me a joke.

How can I help you?

602

| Type | Definition/Notes |
|---|---|
| Prompt | An action by the system, often a spoken request or information. |
| Response | An action by the caller, usually a spoken response (or lack thereof). A response is always tied to a specific prompt. |
| Command | A command is delineated by a unique beginning and ending character, e.g., <command>, and is chosen from specific command words. |
| Comment | Comments are delineated by a unique beginning and ending character. We will use braces, e.g., {comment}. |
| Scene heading | Scenes must have unique names or numbers, and are often used as a destination for a go-to (jump) command. A scene extends from one scene heading to the next (or to the end of the script if there is no next scene) |
| Event | An event is typically a script that is executed. It may initiate a database call with information gathered from the caller, for example, or hang up the phone. |

FIG. 6

So, would you like to purchase a product?

| **Prompt Sub-Menu** |
| --- |
| Continue |
| Menu Item |
| Yes-No |
| Collect Information |
| Special Case |
| To be Done |

FIG. 7

*Close +Add row *View grammar

*Save -Delete Row *Change defaults

| *Current Prompt:* | Please select one of the following by saying it: *chouce1, choice2, or repeat* | | | | |
| --- | --- | --- | --- | --- | --- |
| **Choice** | **Alternative wording** | **Order** | **Response** | Pronunciation (optional) | **Action** |
| *Choice1* | | 1 | show | | go-to *scene1* |
| *Choice2* | | 2 | | | go-to *scene2* |
| Repeat | "What were the choices?" , "go back", "please repeat", "say again" | Last | | | Return to menu 2 times before defaulting |

FIG. 8

This is a special case of a menu prompt-response.

*Close +Add row *View grammar
*Save -Delete Row *Change defaults

| *Current Prompt:* | Please select one of the following by saying it: *chouce1, choice2, or repeat* | | | | |
|---|---|---|---|---|---|
| **Choice** | **Alternative wording** | **Order** | **Response** | Pronunciation (optional) | **Action** |
| Yes | use system list | 1 | show | | go-to *scene1* |
| No | use system list | 2 | | | go-to *scene2* |
| Repeat | "What were the choices?" , "go back", "please repeat", "say again" | Last | | | Return to menu 2 times before defaulting |

FIG. 9

*Close +Add row *View grammar
*Save -Delete Row *Change defaults

| *Current Prompt:* | *Please specify InfoToUse* | | | | |
|---|---|---|---|---|---|
| **Field name** (no specs) | **Description of field** | **Format of question** | **Part of question block?** | Pronunciation (optional) | **Action if filled** |
| *InfoToUse1* | Information to use | Please specify *InfoToUse* | no | | *Continue* |
| Repeat | "What were the choices?" , "go back", "please repeat", "say again" | | | | Return to field prompt 2 times before defaulting |

PET STORY:
Caller: What can you tell me about?
System: I can tell you about my *dog.*
OK. What's it's name?
*He's* called *Rover*. Would you like to hear a story about *him*?
Sure.
*(Story about Rover.)* Would you like another story about my pet?
OK.
*(Second story about Rover).*

| | |
|---|---|
| Initial prompt: What would you like to talk about? | Mode: Text-to-speech (default voice) |
| Follow-up default prompt: What else would you like to talk about?/Do you want more of the same? | Mode: Text-to-speech (default voice) |
| Key phrases: enter here separated by commas | Go to Dialog_Applet_Name |
| Key phrases: enter here separated by commas | Go to Dialog_Applet_Name |

Click here to add another line

FIG. 13

SYSTEM AND METHOD OF WRITING AND USING SCRIPTS IN AUTOMATED, SPEECH-BASED CALLER INTERACTIONS

CROSS-REFERENCE TO RELATED APPLICATIONS

This application claims the benefits of and priority to U.S. Provisional Patent Application Ser. No. 60/912,562, filed on Apr. 18, 2007, U.S. Provisional Patent Application 60/912,572, filed Apr. 18, 2007, U.S. Provisional Patent Application 60/912,570, filed Apr. 18, 2007 and U.S. Provisional Patent Application No. 60/969,065, filed Aug. 30, 2007, the disclosures of which are incorporated herein by reference in their entireties.

FIELD OF THE INVENTION

This invention relates to tools for creating complex scripts for automated speech or text dialogs that can be conducted between a human and a computer for purposes such as entertainment or education, typically with a commercial purpose which may include advertising or marketing, and for which those scripts can be translated automatically to an interactive speech system that is engaged, for example, over the telephone.

BACKGROUND

Automated systems using speech recognition and text-to-speech synthesis techniques are familiar to persons calling over the telephone, for example, to a company call center. The design of the dialog in such application is relatively straightforward, since the designer is limited to a set of activities that (1) make sense in the context of the call (one doesn't order pizza when calling a bank); and (2) that are requests that the system can fulfill (e.g., providing an account balance). With the increasing use of mobile phones, however, it is possible to design a system that is more entertaining or informative, yet still allows the caller to impact the flow of the call by what they say. Such dialogs can potentially cover almost any subject, and significant creativity is required to keep the caller engaged and feeling that responses of the computer are relevant to what they said. Persons who write dialog designs for call centers are not chosen for their entertainment skills, and the tools available to them are not designed for the unstructured flow of an entertainment-focused system.

On the other hand, script writers for traditional entertainment channels such as television create dialog scripts that include a linear progression of dialog lines that the characters in the script take turns delivering. The classic creative writer gets to determine both sides of the conversation, and there is no "branching," that is, the writer doesn't have to write a number of alternative replies that cover anything the independent speaker (the caller) may say. The linear technique is effective for applications in which the scripts are linear and predictable, such as for movies, plays and the like.

SUMMARY OF THE INVENTION

There is a need for a tool that will let talented writers with skills in entertainment write dialogs for interactive media, in particular, a speech-oriented phone call if a successful commercial application that engages the caller is to be developed. The ideal system would keep the caller engaged long enough to deliver a series of advertisements, for example, or to close a sale of a product. In addition, unlike movie scripts which are stable once the movie is created, a dialogue system is likely to be continually updated with new material and grow very complex and multi-functional over time, requiring a tool that makes it feasible for creative talent to manage such as process.

Current tools for developing automated dialogs are aimed at the structured interactions of call centers, or, in some cases, such as automated directory assistance, at very short interactions with a known purpose (where the purpose is to complete a task as quickly as possible and not to engage the caller). The latter have almost no interaction at all, and there is no need for a specialized tool to create the dialog. The former can be somewhat complex if a transaction, for example, requires gathering a significant amount of information, and tools have been developed for the "Interactive Voice Response" (IVR) systems of call centers. These typically take two forms:

(1) a graphical display system where boxes describe tasks such as "ask for an account number" and lines between boxes describe a response from the caller that causes that path to be taken, e.g., "I don't know my account number" versus "five eight four one six."

(2) A programming formalism that is much like a computer program, sometimes with aids such as "drag and drop" that make changes easier.

The first approach has the disadvantage of being only useful for highly structured tasks, because too many boxes can't be viewed easily on a computer screen and complex flow results in "spaghetti" connecting all the boxes and is almost useless.

The second approach has some of the disadvantages of the first, since a very unstructured application will cause jumping from one part of the "program" to another and make it hard to follow. In addition, programming requires programming skills and is not particularly compatible with creative talent used to writing linear scripts.

There is a need for a tool that will allow creative talent to write interactive, branching, and complex scripts for an interactive service that might be delivered for example to a mobile phone user.

An additional distinction between conventional dialog systems (e.g., in call centers or directory assistance) and one aimed at engaging the caller is that the caller needs to have a different experience if they call back. Thus, the system should remember, for example, what jokes were told in the last conversation and not repeat them. Thus, the invention includes features for varying the dialog in such cases and driving it dynamically from a database that has alternatives to preserve variety.

There are platforms and standards capable of delivering such applications. For example, VoiceXML is an industry standard supported by the World Wide Web Consortium for delivering interactive telephone applications. There are platforms that can execute interactive applications written in VoiceXML and support automated speech recognition and synthesis so that a computer can interact with a caller by voice. This does not exclude delivering some information by text or receiving it by text (or a combination of speech and text) if a device like a mobile phone has a screen and keypad. However, with text hard to enter and small screens, speech may often be the preferred means of interaction. This invention can make use of these existing solutions and others to deliver the interactive entertainment by expressing the designed dialogs into VoiceXML code, for example.

Dialogs between consumers and computers using speech recognition and text-to-speech technology have the potential for engaging consumers—usually over the telephone channel in dialogs that entertain and inform and provide the basis for a commercial service supported, for example, by advertising, product sales, the creation of customer loyalty to a particular service, or subscription fees. The basic approach of the invention is to make writing a dialog more like writing a conventional script. In fact, one way to begin creating the dialog system is to write one example of an interaction that might occur between the caller and the computer. The tool then allows elaborating that initial start into a dialog that branches based upon what the caller says. At any time, the writer can view alternative paths as if they were a conventional linear script in order to understand where improvements or additional material may be required or advisable. The script can evolve even after it is "published," unlike conventional scripts, and updates can be immediately made available to callers. The system keeps track of paths that the writer has not yet addressed and allows the writer to systematically deal with each one. The system is consistent with current business applications and can use more conventional interactions, for example, if a caller agrees to buy something and the appropriate information should be entered to pay for and receive that product.

In one aspect, a machine-implemented method includes enabling a script writer to enter a line of dialog for use by a call center in a connection with a machine-implemented, speech-based, caller-interaction. A line type is assigned to the line of dialog. The method includes determining, based on the assigned line type, information to incorporate the line into the user-interaction and enabling the script writer to provide the information anytime after the line is entered.

Typically, the script may enter additional lines of dialog while deferring providing the information. In some implementations, the information that has not yet been provided and is tracked so that the writer can enter that information at anytime after the line is entered.

In some implementations, the method includes enabling the script writer to instruct that the dialog be incorporated in a user-interaction. In such instances, the method includes prompting the script writer, in response to the instruction to incorporate the dialog, to provide the information that has not yet been provided. If, for example, all of the information has been provided, the entered dialog may be incorporated into the user-interaction.

In certain embodiments, assigning a line type to the entered line includes analyzing contextual information (e.g., the format) associated with the line of dialog and determining, based on the contextual information, the line type to be assigned to the line. In certain embodiments, the method includes enabling the script writer to specify the line type anytime after entering the line assigning the specified line type to the line. In those embodiments, the script writer can defer specifying line types for entered dialog and, instead, enter additional lines of dialog.

In another aspect, a call center includes an application server adapted to support computer-implemented, speech-based, caller-interactions, a database coupled to the application server to store data used by the application server and a script writer interface coupled to the application server and to the database. The script writer interface is adapted to enable a script writer to enter a line of dialog for use in a connection with the machine-implemented, speech-based, caller-interaction. The call center is adapted to assign a line type to the line of dialog that the script writer enters and identify, based on the assigned line type, information to incorporate the line of dialog into the caller-interaction. The script writer interface is further adapted to enable the script writer to provide the information anytime after the line is entered.

In yet another aspect, an article includes a machine-readable medium storing machine-executable instructions that, when applied to a machine, causes the machine to enable a script writer to enter a line of dialog for use by a call center in a connection with a computer-implemented, speech-based, caller-interaction, assign a line type to the line of dialog, determine, based on the assigned line type, information to incorporate the line into the user-interaction and enable the script writer to provide the information anytime after the line is entered.

In still another aspect, a database format to support an interactive call center and a script-format application development environment simultaneously is disclosed. The database format includes a plurality of data records to generate an interactive voice response application. The database format enables a script writer to view and edit the data records from a display terminal, and the records in the database format support the interactive voice response application.

In some implementations, one or more of the following advantages are present.

A script writer can create lines of dialog for use in connection with highly complex, multi-branch dialogs for caller interactions in a substantially intuitive, straightforward manner without being bogged down with the various logistical details related to implementing the dialog. The system keeps track of the logistical details so that the script writer can focus on being creative. Once the creative aspects of the script writing process have been completed, the script writer or someone else is prompted to provide all of the other information required in order to implement the entered dialog. This helps ensures that there are no inconsistencies or other problems with the dialog.

The system also enables the script writer or someone else to test the dialog to ensure that the dialog flows well and is effective at providing an effective and enjoyable caller experience.

The system enables the dialog to be delivered as developed by the script writer with little effort. The script can be stored, for example, in a database that the system converts to standard form such as VoiceXML for delivery by currently available Interactive Voice Response systems.

Moreover, a dialog can be created while an existing dialog is being executed by the call center to support ongoing caller interactions. When the new dialog is complete, it can be incorporated into the ongoing caller interactions, without substantially interrupting the caller interactions that are in progress.

In some implementations, the system and methods disclosed herein may facilitate the creation of complex, creative, interactive dialogs for implementation by a call center. Such dialogs may create enjoyable interactive experiences for callers, engaging the callers considerably in the complex interactions.

Other features and advantages will be apparent from the description and drawings, and from the claims.

BRIEF DESCRIPTION OF THE DRAWINGS

FIG. 3 is an exemplary set of dialog lines entered by a script writer.

FIG. 4 is another exemplary set of dialog lines entered by a script writer.

FIG. 5 is still another exemplary set of dialog lines entered by a script writer.

FIG. 6 is an exemplary list of line types that may be assigned to a line (or to which a line can be changed).

FIG. 7 is an exemplary drop down style menu of choices for providing additional information about a prompt (one of the line types in FIG. 6).

FIG. 8 is an exemplary dialog box for viewing and providing additional information about a prompt when the script writer or an assistant elaborates on the options.

FIG. 9 is an exemplary dialog box for viewing and providing additional information about a menu-type prompt.

FIG. 10 is an exemplary dialog box for viewing and providing additional information about a variable collecting prompt.

FIG. 12 is an exemplary dialog template that a script writer might create.

FIG. 13 is an exemplary table that allows a script writer to describe what the caller might say and how to respond (or where to go in the script) depending on the type of response.

DETAILED DESCRIPTION

Figure 1:
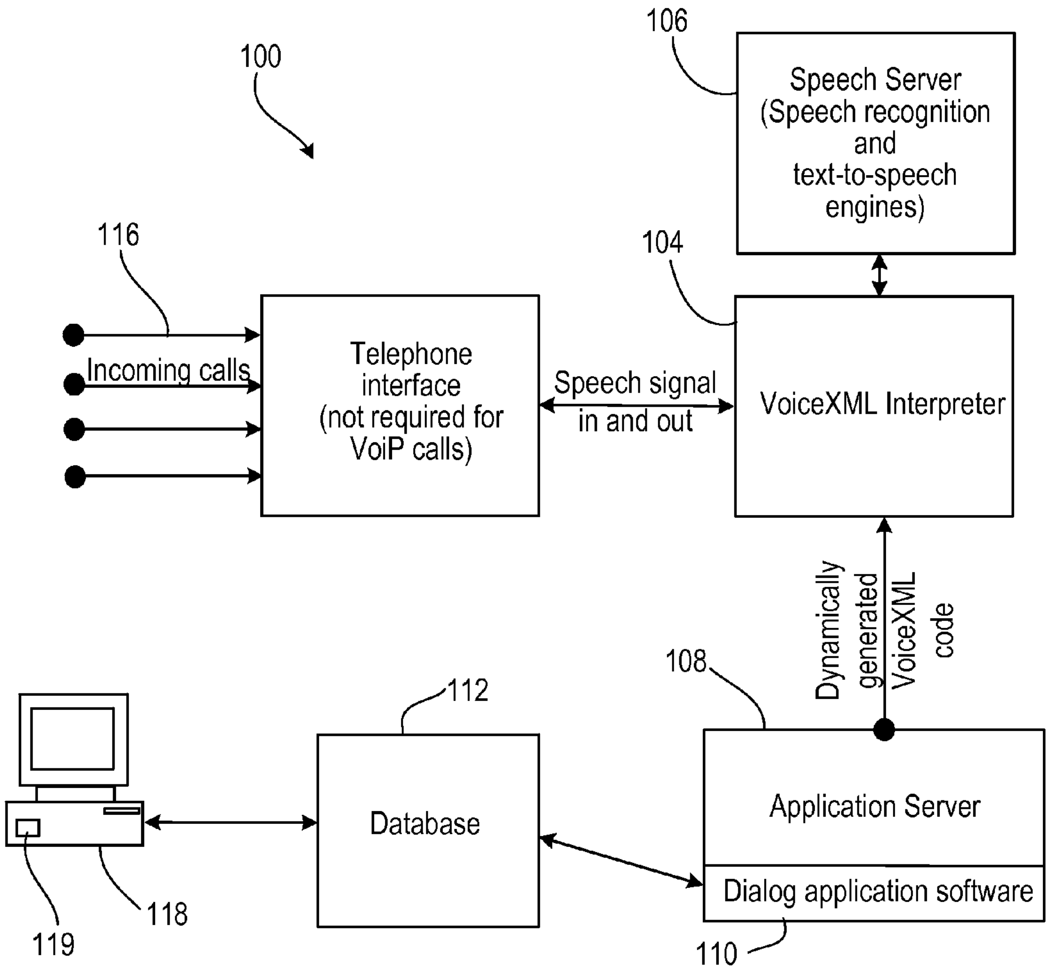
FIG. 1 is a block diagram showing one embodiment of a call center with a supporting database in a particular form that can generate the user interaction based upon entries in that database and software on an application server.

FIG. 1 is a block diagram showing one embodiment of a call center 100 adapted to support automated, speech-based interactions with callers accessing the call center 100. Such interactions may include, for example, those in which the user's speech is processed using speech recognition techniques and audible, speech-based responses are generated automatically in response to the user's speech.

The illustrated call center 100 includes a telephone interface 102 coupled to a VoiceXML interpreter 104. A speech server 106 including, for example, speech recognition and text-to-speech engines, is coupled to the VoiceXML interpreter 104. An application server 108, at which dialog application software 110 resides, also is coupled to the VoiceXML interpreter 104. A database 112 is coupled to the application server 108. A script writer's interface 118 (typically including software running on a PC or web-based software used by a "browser" on the PC) is coupled to the database as well. In the illustrated implementation, content development software 119 (script writer supporting software) resides at the script writer's interface and enables the script writer to enter, review and edit information related to caller-interactions conducted by the call center 100. Incoming calls from remote users (not shown) arrive at the call center 100 via one or more communication lines 116.

The telephone interface 102 is adapted to receive and transmit speech and other audible signals to and from users (not shown) accessing the call center 100 over voice communication lines 116. In some instances, for example those in which the remote users call in to the call center 100 using voice over Internet protocol (VoIP), the telephone interface 102 may not be necessary.

The telephone interface 102 communicates internally with the VoiceXML interpreter 104, relaying data to and from the VoiceXML interpreter. VoiceXML is a World Wide Web Consortium (W3C) standard Extensible Markup Language (XML) format for specifying interactive voice dialogues between a human and a computer. The VoiceXML interpreter 104 uses the VoiceXML code to control the speech engines and retrieve their results, using those results to decide what the next branch of VoiceXML codes should be executed. The VoiceXML interpreter 104 communicates with the speech server 106. In some implementations, the speech server 106 includes a speech recognition engine and a text-to-speech engine. In general, a speech recognition engine converts spoken words to machine-readable text. In some implementations, the speech recognition engine recognizes specific words and phrases in the user's spoken language. For example, the speech recognition engine may be adapted to understand language specified as fitting a form described by one of several well-known formats, including the W3C standard Speech Recognition Grammar Specification ("SRGS"). See http://www.w3.org/TR/speech-grammar/. The collection of spoken words and phrases that the system can understand may be referred to as a "grammar." There are other formats, such as statistical language models, which allow for more flexibility and less constrained spoken responses. In a simple example, the speech recognition engine should be adapted to recognize a caller's spoken responses "yes" and "no." in response to a yes-or-no question. In general, a text-to-speech engine converts written text into speech, avoiding the need to record human speech that covers all the things a script writer may wish the computer to say. Such text-to-speech engines can have different voices, e.g., male versus female.

The VoiceXML interpreter 104 communicates with the application server 108 using VoiceXML code. In some implementations, the application server 108 is a standard web server. Its functionality can be based, for example, on either Java 2 Platform, Enterprise Edition™ (J2EE) or Microsoft®.NET. J2EE is a platform for server programming in the Java™ programming language. Microsoft®.NET is a software component that is part of the Windows® operating systems and that manages the execution of programs. Programs can be written in either language that generate VoiceXML code for execution by a dialog system, analogous to the way they are used for generating HTML code for displaying visual Web pages based on a database.

The dialogue application software 110, residing at the application server 108, may be written, for example, in Java™ programming language or Visual Basic™ programming language. The dialog application software 110 interacts with the various other components illustrated in FIG. 1 to provide users with an automated, machine-based (e.g., computer-based), interactive experience. The dialogue application software uses the database generated through the script-writing process to drive an interaction that follows the script. Thus, when the database is changed, the interaction with the caller is changed.

The application server 108 is coupled to the database 112 and is adapted to store and/or retrieve data at the database 112. In general, the database 112 is a structured collection of machine-based records or data. The database 112 may be implemented as one or more devices that are capable of storing data in a retrievable manner. In a preferred embodiment, the database 112 is adapted to supply data to the dialog application software 110 and to receive data from the content development system 110. Typically, the database 112 can shift between the data-receiving and data-supplying functions automatically and seamlessly.

In general, the script writer interface 118 (e.g., a computer terminal) enables writers to view, create and edit dialogs for caller interactions with the call center. The script writer can perform these functions in a highly intuitive, straightforward manner. In some implementations, the script writer may view, create and edit while the call center 100 is interacting with one or more callers using existing dialogs. Such new or modified dialogs may be created without interrupting calls that are in progress. In those instances, if the writer finishes creating or editing, he or she can instruct the call center 100 to incorporate the new and/or edited dialog into ongoing and future caller-interactions. In response, the call center 100 translates the script writer's dialog into machine-executable instructions and begins to integrate the new dialog into existing and future user-interactions.

Figure 2:
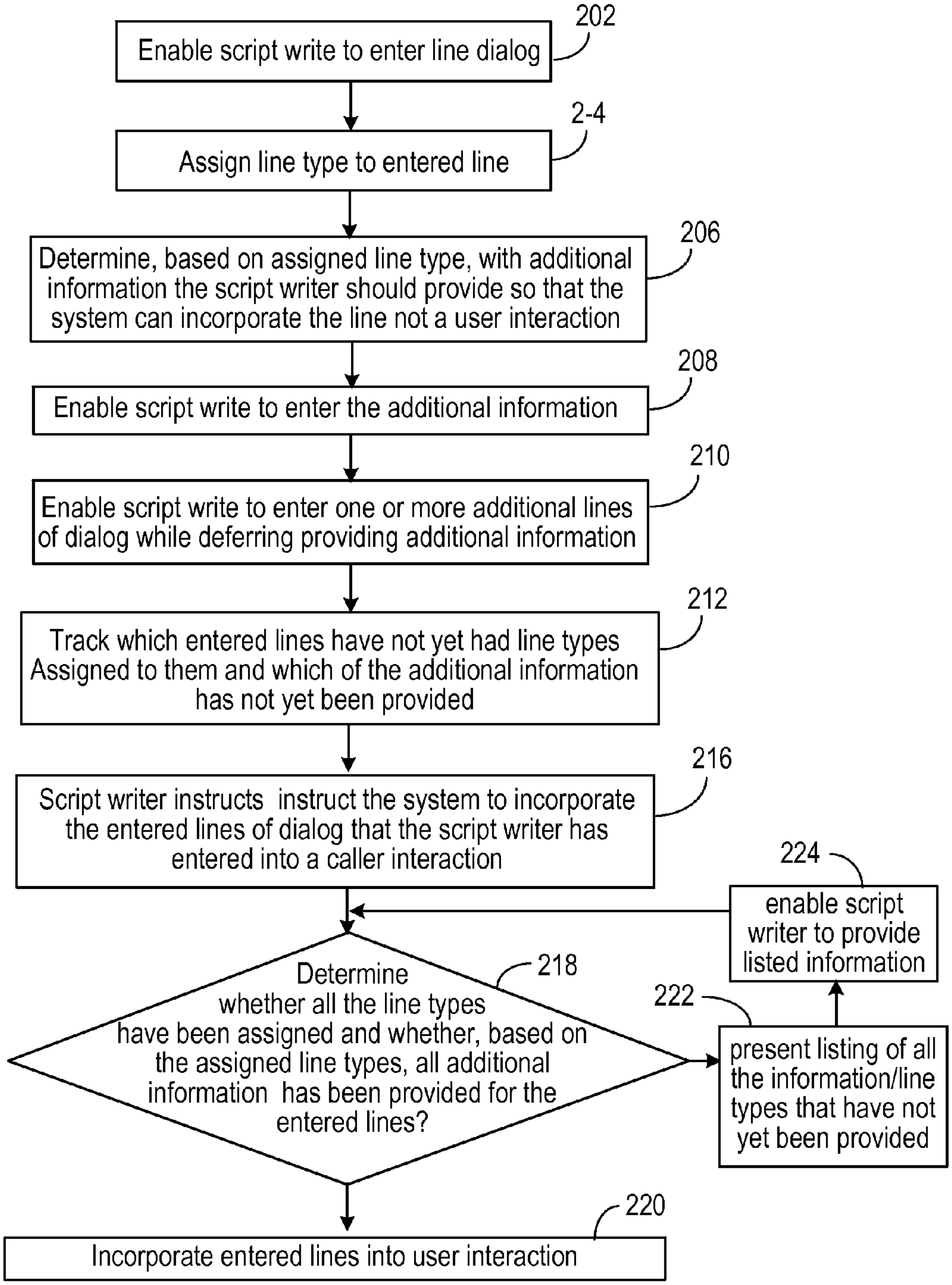
FIG. 2 is a flowchart of a method of a script writer creating an interactive dialog for execution by a system (e.g., a call center).

The flowchart of FIG. 2 shows one implementation of a method, in which a system (e.g., the call center 100 of FIG. 1) enables a script writer to create a dialog for use in connection with computer-automated, speech-based caller-interactions. The functionality represented in the illustrated flowchart enables the script writer to easily and intuitively create complex dialogs for use in such user-interactions in a relatively straightforward manner, even if the script writer has little or no familiarity with computer programming. The system automatically tracks the information it will need to incorporate the script writer's dialog into the caller-interaction. The script writer, therefore, is free to focus on developing creative aspects of the script without being bogged down by the difficulties associated with having to keep track of the myriad of minute details that typically are associated with fully specifying complex strings of dialog. Once the script writer has an idea of what the dialog will look like, the system can show him or her which of those details still needs to be provided (or entered) in order to incorporate the script into a caller interaction.

According to the illustrated method, the system enables 202 the script writer to enter a line of dialog. This may be done at a script writer's interface (e.g., 118 in FIG. 1). The platform for the script writer to enter the dialog can vary. To maintain familiarity, the preferred platform is a word-processor-style display on a standard personal computer. In some implementations, the platform is a combination of different styles. A processor (e.g., in the script writer interface 118) may be adapted to interpret the entered dialog and generate appropriate code for incorporating the entered dialog into a caller interaction.

FIG. 3 shows an example of typical set 300 of lines that a script writer might enter in a word-processor-style platform at script-writer terminal 118. The illustrated set 300 of lines is for an interaction between a caller accessing the call center 100 and an automated voice to be delivered by the call center 100. Certain aspects of the dialog delivered by the call center 100 is responsive to statements made by the caller. Typically, the lines of dialog that are to be delivered by the call center 100 are recorded by actors or generated using automatic text-to-speech engines (e.g., a text-to-speech engine in speech server 106).

The illustrated set 300 of lines is organized in manner that is very similar to how a script writer would traditionally write lines of dialog. It is likely, therefore, that a script writer would consider the dialog entry process to be highly intuitive.

The illustrated example includes various types of lines, each type performing a specific function or functions. The illustrated line types include scene headings 304*a*-304*d*, prompts 306*a*-306*f*, responses 308*a*-308*e*, comments 310 and commands 312*a*, 312*b*. Other types of lines include events and context tags (not shown in FIG. 3). In the illustrated example, the line type for each line is indicated by its respective context and/or format. A script writer may, therefore, designate line types as he or she enters lines by using particular formatting conventions. Various formatting conventions may be used to identify various line types. In some implementations, the system enables the script writer to access one or more menus at the script writer interface 118 to specify line types for entered lines, regardless of whether the lines have been formatted to identify line type.

In the illustrated example, each scene has its own scene heading 304*a*-304*c*. The scene headings 304*a*-304*c* provide a descriptive identifiers for the dialog that follows the scene heading. For example, the scene heading "JOKE 1" identifies a scene that includes a joke. Scene headings also may be used in the dialog as navigational landmarks for the system to use in moving from scene-to-scene. It is typical, therefore, that each scene heading be unique. In some implementations, if the script writer attempts to use the same scene heading to identify more than one scene, the system warns the script writer than doing so may cause the system to have problems incorporating the lines into a user-interaction. In the illustrated example, the scene headings 304*a*-304*c* are designated by using all capital letters. In some implementations, the call center 100 is adapted to recognize that lines using all capital letters are scene headings. This is an example of how formatting can automatically designate a line type without the writer explicitly doing so.

The set 300 of dialog lines also includes prompts (e.g., 306*a*-306*f*), which are lines that are to be delivered by the call center 100 to a caller. Some prompts are responsive to statements made by the caller. Prompts can be statements, questions or combinations thereof. For example, in the illustrated implementation, the dialog line 306*a*, "how can I help you?" is a prompt. Similarly, dialog line 306*d*, "my first complaint is about indecisive callers like you. It takes a lot of electrons is I have to ask a question twice. Haven't you heard of global warming?" is a prompt.

In some instances, a prompt can contain a variable, such as the caller's name, that the caller has provided during the interaction. An example of such a prompt is "how are you today <name>?" In that example, the field name "<name>" represents the variable that is the caller's name. Typically, that variable is obtained in response to a prompt requesting the caller's name. The system stores the caller's name as a variable, assigns the variable the field name of "<name>" and delivers the caller's name when delivering the prompt "how are you today <name>?" If the caller has indicated, for example, that her name is "Jane", then the prompt would be delivered as "how are you today Jane?" Typically, field names are unique to facilitate using field names throughout the dialog.

The script writer may incorporate variables directly into the entered lines of dialog. To do so, the script writer can simply type the field name for that variable (e.g., "<name>"). To deliver the variable in a prompt, the call center 100 may use a text-to-speech (TTS) synthesis program to read the text (e.g., the caller's name) associated with the variable. Alternatively, the call center 100 may deliver the variable using a recording of the text that corresponds to the specified variable.

The writer may indicate that certain text in a dialog line is a field name for a variable by using a formatting convention, such as follows: <variable>. Field names assigned to data collected from a caller generally differ from one another. This may be particularly important if the field name is to be used in a later prompt or to access information stored in database 112 and where a later reference to the same variable name might cause an error. In some implementations, if the script writer attempts to assign a field name that has been used before, he or she is warned, but may be allowed to repeat the field name if that is his or her intention.

The term "response" may refer to any line of dialog that it is expected a user interacting with the call center might speak. Responses 308*a*-308*e* can be statements, questions or combinations thereof. Responses may be responsive to prompts or may be out-of context statements or questions relative to the dialog. For example, a dialog might relate to a joke and the user might simply say “I want to do something different.” Other examples of responses are shown in the illustrated implementation, including “Tell me a joke.” 308*a* and “OK, go ahead.” 308*c*. In the illustrated example, the responses 308*a*-308*e* are indicated as such by being indented a certain amount. The term “comment” refers to a note about the dialog.

For example, the writer may include a comment to indicate that the writer wants to add something to the dialog at a later time. A comment also may include instructions on how a prompt, for example, should be delivered. Such an instruction might explain that the prompt should be delivered with a happy tone. In that situation, an actor hired to record that prompt would see the comment and know that the prompt should be recorded using a happy tone.

In the illustrated example, a comment 310 is designated by a distinctive style that enables the call center 100 to readily recognize that it is a comment. For example, in the illustrated implementation, the comment “[Plaintively]” is enclosed by brackets, indicating that the corresponding instruction therein is a comment. In that example, an actor hired to read the corresponding prompt would know to read the prompt “You don’t want to hear my complaints? Last chance!” using a plaintive tone. Alternatively, the system may be adapted to recognize that as a comment and deliver the corresponding response 306*c* accordingly.

A command 312*a*, 312*b* may be considered a type of comment. A command is a line in the dialog that provides instructions related to implementing the dialog. In the illustrated implementation, the commands are indicated as such by the inclusion of brackets “<” and “>” and by the use of the key words “go to” (an example of a particular command). In some implementations, a script writer may simply enter a comment, access a menu of options related to that comment and select the option called “make command” to turn the comment into a command.

Commands also may be used to control various other aspects of the user interaction, such as controlling the voice being used to deliver dialog. An example of such command is “<change voice to Marie>.” A single command can include multiple instructions, such as, “<use female voice\loud>”. Controls allowed by Speech Synthesis Markup Language (SSML), another World Wide Web Consortium standard, can be placed in a command prefaced as “<SSML:>” and passed on appropriately as Markup.

An event typically is used to identify call center functions such as hanging up or retrieving information from a database. A list of available events can be presented to the script writer, and if one is chosen, any parameters required for that event may be requested. The script writer generally has the option to postpone any decisions about those parameters or let some less critical parameters be entered by an assistant. Another example of an event is to reset various information that has been collected during a user interaction once a call is terminated.

Context tags may be considered a type of comment and act as context identifiers. In some implementations, the system is adapted to recognize script tags and insert certain context-specific advertisements or information that, typically, comes from sources outside the script.

They can be formatted as a comment with an identifier “context tag:” They can be inserted to give keywords descriptions of the context of a dialog at several levels, including a global level, describing the overall context of the dialog (e.g., humor, health information, adult content, suitable for children) or scene level, referring to a particular scene (e.g., a joke about beer or a story about nature). An context tag may indicate a suitability score for advertising (say 1 through 5, with 5 being the most suitable location for an advertisement). This may enable the system to use the most suitable spots first.

Typically, the system implements a dialog, unless otherwise instructed (e.g., by a “go to” command or the like), in a linear manner sequentially from scene-to-scene. In some implementations, the end of a scene may be indicated by an event (e.g., an instruction to terminate the call) or a command (e.g., to proceed to a different scene in the dialog). In the illustrated example, the “JOKE 1” scene ends at scene heading 302*c*, “OFFER FOR SALE 1.”

A block of dialog is a collection of lines that are intended serve a particular function, such as obtaining certain information (e.g., the caller’s name) from the caller. In that example, the block of dialog may include one or more prompt-response pairs. A prompt-response pair includes a prompt that is delivered by the call center (e.g., requesting the caller’s name) and a response to be spoken by the caller (e.g., providing the caller’s name). In general, the call center 100 keeps track of the fact that the lines in a block are logically related to one another.

Blocks of dialog also may include a series of prompts and/or responses that are logically related to one another. In those instances, the call center may keep track of the fact that the series of prompts and/or responses are logically related. A block may be followed, for example, by a statement that relates to the entire block. As an example, a block that relates to a survey may be followed by the line, “thanks for taking this survey.” Additionally, in some instances, a statement may be made about an entire block using one or more variables that have been provided during the block by the caller. For example, if, during a particular block, the caller has stated that he or she likes puppies, walks on the beach and beer, the block may be followed by the line, “to confirm, you like puppies, walks on the beach, and beer.” The end of a block may occur, for example, at the appearance of a line that sums up the subject matter of the block or at the occurrence of an event after the block.

Blocks may be designated by using a formatting convention in the entered dialog or by explicitly designating certain dialog as a block using a menu.

In the illustrated example, changes in speaker (i.e., changes between lines delivered by the system and lines spoken by the caller), are indicated by changes in indentation from line to line. More particularly, the caller’s lines are indented more than the call center’s lines. In some implementations, the call center 100 is adapted to recognize that convention as representing changes in speakers.

In an alternative implementation, the dialog explicitly identifies the speakers associated with each spoken line. An example of that is shown in FIG. 4, which represents an interaction between a system, whose lines of dialog are indicated by the designation, “system” and a caller accessing the system, whose lines of dialog are indicated by the designation: “caller.” The illustrated implementation does not need changes in indentations to reflect changes in speakers.

To facilitate dialog entry, the system may be adapted to enable the script writer to use certain keys to switch between speakers in the dialog. So, key “F1,” for example, may be associated with the system and the key “F2” may be associated with the caller. In those instances, the dialog writer may simply select “F1” or “F2” to correlate a line of dialog with either the call center 100 or the caller. This technique may simplify the dialogue creation process.

Some dialogs may include lines that are intended to be spoken by the call center using different voices. An example of this is shown in FIG. 5. In the illustrated dialog, both the "Joe" line and the "Cindy" line are intended to be delivered by the system. In a typical implementation, the "Joe" line would be delivered using a male voice and the "Cindy" line would be delivered using a female voice. In some implementations, the system is adapted to recognize that both lines are to be delivered by the system based on the fact that both lines indented the same amount as one another. The user's response, "Tell me a joke," on the other hand, is indented a greater amount than the "Joe" and "Cindy" lines, indicating that this is a response.

In a typical dialog where the system is expected to deliver dialog in more than one voice, the name before the colon can specify the voice (e.g., the name of a synthesized text-to-speech (TTS) "voice" or, indirectly, the person to record prompts for this "character"). In Some instances, if no name is specified, it may be assumed that each level of indentation continues with the same voice until and if a name is specified. If no name is specified in the dialog, the call center 100 usually will assume a default voice.

Referring again to FIG. 2, the system assigns 204 a line type to each line of dialog that the script writer enters. In some implementations, to the extent possible, the system does so automatically based on the line's context (e.g., its formatting). Typically, however, the system also enables the script writer to instruct the system how to assign a line type for the lines entered. Moreover, if the system has automatically assigned a line type to a line, the system typically enables the script writer to override that assignment.

The system can enable the script writer to explicitly specify or change assigned line types in a number of ways. In some implementations, each time the script writer enters a line of dialog and hits the "enter" (or "return") key, the call center presents a dialog box to the script writer prompting the script writer to specify a line type for the line just entered. In such cases, provisions typically are available to allow the script writer to defer specifying a line type until a later time.

In some implementations, the call center enables the script writer to access (e.g., by "right clicking" on the entered line itself) a drop down menu of choices for assigning (or changing a previously assigned) line type. FIG. 6 includes a line 306*a* of dialog and an example of what such a drop down menu 602 might look like. In the illustrated example, the drop down menu 602 is a table. The left column of the table identifies a number of selectable options for line type. The right column of the table provides a definition and notes about each of the selectable options. In some implementations, the options presented to the script writer may differ from the options shown in the figure.

In a typical implementation, the script writer would be able to select among the illustrated options to assign a line type to the corresponding line 306*a*. Such functionality typically is accessible anytime after the script writer has entered the line 306*a* of dialog. Accordingly, the script writer may specify a line type immediately after the line is entered.

In some implementations, if a line has been designated a comment (e.g., by assigning a "comment" line type to the line), the system may enable the script writer to access a menu of options that includes "make event," the selection of which indicates that the line type should be "event," "make command," the selection of which indicates that the line type should be "command" and "make context tag," the selection of which indicates that the line type should be a "context tag."

Once a line type has been assigned to a line, the system determines 206 what additional information the script writer should provide in order for the system to incorporate the entered line into an interactive dialog. This may include information that is absolutely required or information that the script writer may want to consider providing. For example, in a prompt that asks the caller to select among various options (e.g., prompt 306*f*, "What kind of product are you interested in? A book or a music cd?"), the script writer will likely need to provide information about how the system should react to the caller responding "book," "cd," "book and cd" or in some other way. Similarly, if the line is a response, the script writer may want to specify other ways that the caller might state the expected response.

Once the system determines what additional information the script writer should provide, the system enables 208 the script writer to provide the additional information. In some implementations, the system prompts the script writer to provide the additional information immediately after the line is entered; in other implementations, the system creates itemized listings of the information needed for each line that the script writer can selectively access anytime after the line is entered.

In some instances, the system solicits the needed information with a series of questions or prompts to the script writer. In some of those instances, the script writer's response to each question may influence the next question that is presented. For example, the system may solicit the script writer to specify a line type by presenting a list of line type options that includes: prompt, response and comment. If the script writer selects "prompt," then the system may follow up by asking whether the prompt is a "yes-or-no" type prompt or a prompt that will present other options to the caller. If the script writer selects other options, the system may follow up by asking how many options.

If, on the other hand, the script writer identifies the line as a "response," then the system might next prompt the script writer to identify any alternative ways that the caller make the same response. For example, if a caller response is "yes," then alternative ways of saying "yes," may include saying "yep," "sure," "yes please" and "ok." The system would prompt the script writer to specify that information or, in common cases such as yes-no, use a default pre-designed set of alternatives (which could be changed or augmented).

Once the script writer assigns a line type, the menu that the script writer can access for that line changes. More particularly, depending on the line type that was assigned to the line, the pull down menu will present a different set of options to the script writer enabling him or her to specify various information for incorporating the entered line into an interactive dialog.

FIG. 7 shows an exemplary drop down menu 750 that might appear for a line that has been designated a prompt. In the illustrated implementation, the options presented in the drop down menu include "continue", "menu item", "yes-no", "collect information", "special case" and "to be done." In response to a script writer's selection, the system may determine that it has all the information about the line that will be needed to incorporate the line into an interactive dialog. Alternatively, in response to a script writer's selection, the system may change the drop down menu associated with the line 652 to prompt the user for additional information for incorporating the line into a user-interactive dialog.

In some instances, the system may be adapted to recognize which of the illustrated options apply to a line based on the context (formatting) of the line. In those instances, the script writer may not be prompted to select among the illustrated options. However, typically, the script writer will be allowed to change a determination made based on context.

In the illustrated implementation, the "continue" option indicates that the prompt should be followed by the dialog that immediately follows the prompt. This may be useful if, for example, a paragraph is intended to be part of one character's continuing speech or if the character changes, but the line still represents a prompt. This can also be used if a variable is to be inserted in mid-sentence in text-to-speech or if recorded prompts are to be concatenated.

The "menu item" option indicates that choices are to be presented to the caller. When a "menu item" option is selected, the system typically enables the script writer to indicate the choices to be presented. For example, in some implementations, in response to a script writer selecting the "menu item" option, the system presents a dialog box to the script writer showing the script writer what information will be needed to incorporate a menu item type prompt into an interactive dialog.

An example of a "menu item" dialog box that includes a table of information is shown in FIG. 8. The illustrated dialog box shows the script writer the current prompt, which is "Please select one of the following by saying it: choice 1, choice 2, or repeat." Typically, the indications choice 1 and choice 2 would be actual choices to be presented to the caller. For example, choice 1 might be "book" and choice 2 might be "a music cd." The "repeat" option is intended to cause the system to repeat the prompt at least once if necessary. The basic function of a menu item is to select among a limited set of alternatives; different alternatives may require different scripts.

The choices (i.e., choice 1, choice 2 and repeat) are listed in the first (or left most) column of the table, with each choice having its own row.

The second column shows any alternative wording, other than the choices themselves, that a caller might use to select among the choices. In the illustrated implementation, no alternative wording is provided for choices 1 and 2. However, "what were the choices?," "go back," "please repeat" and "say again" are identified as alternative wordings for the "repeat" option. Therefore, if the system presented the prompt to a caller and the caller responded by saying "go back," the system would recognize the caller's response as a "repeat" response and respond accordingly.

The "order" column identifies the order in which the options are to be presented to the user. In the illustrated implementation, "choice 1" is presented first, "choice 2" is presented second and "repeat" is presented last. Instead of being identified as "last," the "repeat" option could be labeled with "do not prompt." In that situation, "repeat" would not be included in the menu of spoken choices. This is true of other choices in the table as well. For example, the choice "maybe" could be presented in a table for a yes-or-no type prompt and marked "do not prompt." In that situation, if the caller said "maybe," then the system would respond according to the instructions in the table, which might include delivering the line, "make up your mind! Yes or no?"

The "response" column shows what response to the prompt would be shown if the prompt-response pair were formatted in a linear manner for review, for example, by the script writer. If a response has been typed in linear format, the system will have filed in the appropriate entry in the "response" column; otherwise, the response is generated in its simplest form and added to the script following the prompt. By repeatedly using this and other features the script writer may largely avoid using the dialog box.

The "pronunciation" column can include information regarding the pronunciation of one or more words in the "choice" column. This may be particularly helpful if, for example, there may be more than one possible way to pronounce word(s) in the "choice" column. For example, if the last name "Meisel" appears in the "choice" column, then the "pronunciation" column may include the following: "Meisel=my-ZELL", to show, phonetically, how "Meisel" is correctly pronounced. In that example, the use of capital letters "ZELL" indicates that the "ZELL" syllable is emphasized.

Information in the "pronunciation" column may help actors hired to articulate the dialog lines to know how to pronounce various words. Moreover, information in the "pronunciation" column may be used by a text-to-speech (TTS) system to create a pronunciation for the words in the "choice" column using letter-to-sound rules or by a speech recognition engine to add a dictionary entry (a text form and its pronunciation, again using letter-to-sound rules).

The "action" column contains instructions for the system to react to the user's selection when presented with the prompt. In the illustrated implementation, if the user selects "choice 1," then the instruction "go-to scene 1" applies; if the user select "choice 2," then the instruction "go-to scene 2" applies; and if the user selects "repeat," then the instruction "return to menu 2 times before defaulting" applies. The most common with be to identify the next scene if that option is chosen. The menu choice is carried into that scene, and may be used in the dialog for that scene.

If the user selects "choice 1," then the instruction "go-to scene 1" causes the dialog to proceed to scene 1. Similarly, if the user selects "choice 2," then the instruction "go-to scene 2" causes the dialog to proceed to scene 2. If the user selects "repeat," then the applicable instruction causes the dialog to repeat the prompt to the user up to two times before defaulting.

A default condition could include any number of possible occurrences. For example, in the event of a default condition, the system may ask the user if he or she would like to be transferred to a live operator. Alternatively, in the event of a default condition, the system may ask the user if he or she would like to start over. In some implementations, it is possible for the script writer to specify what happens in a default condition. In other implementations, the default condition may be set and, therefore, not changeable by the script writer.

A menu of script writer options are provided at the top of the illustrated table. These options include "* close," "* save," "+add row," "−delete row," "* view grammar" and "* change defaults."

The "close" option enables the script writer to close the illustrated table and return, for example, to a linear representation of the script. Closing may or may not include automatically saving any changes made to the table. In some implementations, selecting the "close" option causes the system to prompt the script writer to save any changes made before the table is closed.

The "save" option enables the script writer to save any changes made to the table. Typically, the table remains open after the changes are saved.

The "+add row" and "−delete row" enable a script writer to either add or delete rows from the illustrated table. This might be desirable, for example, if the number of choices being presented to the user changes. In some implementations, functionality may be provided that enables a script writer to change the number of columns as well.

The "view grammar" option enables a script writer to view and, optionally edit, the grammatical rules that the system uses globally to interpret caller responses.

The "change defaults" option enables a script writer to edit the way the system reacts to a default condition. An example of a default condition is when the caller fails to say anything in response to a prompt. In that situation, the system may be adapted, for example, to terminate the call or to repeat the previous prompt or to ask the caller if he or she is still interested in chatting. Instructions for responding to a default condition may be accessed and changed, if desirable, by the script writer by selecting the "change defaults" option.

More particularly, in some implementations, if the script writer selects the "change defaults" option, the system presents the following options: "prompt interrupt," "no response" and "not understood." Selection of those options may cause the system to present a dialog box to the script writer that enables the script writer to specify various information. For example, selecting the "prompt interrupt" option may enable the script writer to specify what the system should do if the caller interrupts a prompt that is being delivered before it is complete. Selecting the "no response" option may enable the script writer to specify what the system should do if the caller does not respond to a prompt. Selecting the "not understood" option may enable the script writer to specify what the system should do if the caller's response to a prompt is not understood.

In a typical implementation, for logically coupled prompt-response pairs, the same information will be saved for the prompt and its associated response. A change in either place will be reflected in both places.

FIG. 9 is an example of a dialog box for a "yes-or-no" type prompt. Various aspects of the illustrated table are similar to the table of FIG. 8.

FIG. 10 is an example of a dialog box for a "collect information" type prompt. The prompt, "please specify infotouse" is shown at the top of the table. "infotouse" is a field name to identify the information that the prompt is intended to collect. Such information may include, for example, a telephone number or the caller's name and may be saved and used later during the user-interaction.

The column entitled "field name" has two entries, "infotouse1" and "repeat." These represent the two expected responses that a caller might provide in response to the prompt. Descriptions of each field are provided in the second column of the table. The descriptions include alternative wording for the "repeat" option. The third column shows the format of the question. The fourth column indicates whether the prompt-response is part of a block. The fifth column is to provide pronunciation information about terms that are used in the prompt. The last column shows actions that the system will follow is the caller either provides the infortouse1 data or says repeat.

Referring again to FIG. 7, the "special case" option may include, for example, a "subroutine" to collect user identification information. However, the intention at this level of specification is to keep the options limited and intuitive, allowing the postponement and expansion of alternatives at a different time. Once "special case" is specified, the pull-down menu then offers what special cases are available. Once those are specified, the options required to specify that particular case, if any, are available. One special case is indication of an advertisement insertion point, that is, an appropriate point in the dialog for inserting an advertisement. The system can allow the user to make a special case available as a first-level menu item if it is used often.

A number of technology companies, as well as open-source sites, offer pre-designed dialog "subroutines" for common cases, such as collecting a credit card number. The system can make use of these standard cases, automatically adapting them for example to use the prompt voice specified by the script writer.

The "to-be-done" option enables a script writer to postpone a decision until a later time. This may be specified, for example, when the script writer wants to move on and specify flow later or is unsure about how the flow of the dialog should run. All unspecified entries should be specified before compilation, either by the script writer or by automated processing when that is possible.

The assignment of a line type, subtype or any other information can be changed at a later time. In all cases, the writer is given the option of postponing decisions.

In some implementations, the system presents a "consistency" link to the script writer, the selection of which causes the system to check an associated prompt(s) and related response(s) for consistency and completeness. The presence of unspecified data or other deficiencies or mistakes in the prompt and its responses may be identified to the script writer by the system. In some implementations, the system presents one or more suggestions to the script writer for remedying one or more of the identified inconsistencies.

In some implementations, the system presents a "preferences" link to the script writer, the selection of which enables the writer to choose to be prompted with a series of questions (with explanations of alternatives), usually called a "wizard," rather than working with a table to provide information about implementing a prompt or other line type.

Figure 11:
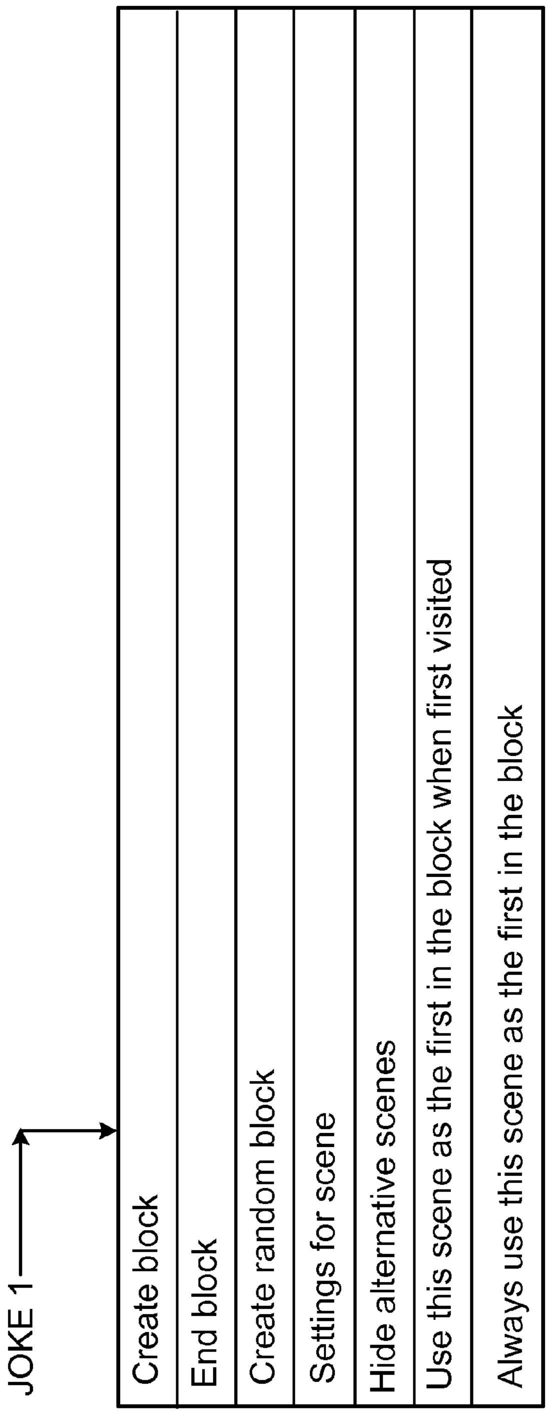
FIG. 11 is an exemplary pull-down menu for setting scene options.

Parameters that apply to an entire scene or scenes can be set using a pull-down menu on a scene heading; the pull-down menu opens a dialog box when "Settings for scene" is chosen. Any global parameters can be reset for the scene, but revert to global settings when the scene is left. An example of a pull-down menu associated with scene settings is shown in FIG. 11. In that figure, the pull-down menu includes the following options: "create block," "end block," "create random block (remove random block)," "settings for scene," "hide alternative scenes (show alternative scenes)," "use this scene as the first in the block when first visited" and "always use this scene as the first in the block."

The "create block" (remove block)" option may be selected if, for example, the scene heading is one that identifies a series of scenes that form a logical entity. For example, there may be a branch, and the writer may wish all the scenes that can be branched to be within a block for ease of navigation. Scenes within such a block may be delineated by indenting more than the scene heading which defines the block, with the end of the block being defined implicitly by a scene heading or command the same level or less indented than the scene heading originating the block. Alternatively, the end of the block could be explicitly indicated by a scene heading designated as the end of a block. In some implementations, this option changes to "remove block" after a block is created. When a block is created, "(block)" may be added to the script after the scene name or the format may be changed to reflect that it is a block.

The "end block" option enables the script writer to specifically delineate a block for clarity, rather than having it implicit by indenting.

The "create random block" option enables a script writer to designate a block of dialog as being random. This means that the content may vary if the caller returns to that point in a subsequent call or at another time during the same call (the call history having been retained in the database). An obvious case is exemplified by the caller asking for a joke. Ideally, they should hear a different joke each time they ask. In some implementations, this option changes to "remove random block" after being selected. Typically, the designation "(random block)" appears after the scene heading (or some distinguishing format is applied) to indicate that the block is a random block.

The "settings for scene" option enables the script writer to indicate settings (e.g., default voices, responses, etc.) that apply to the scene.

The "hide alternative scenes" enables the script writer to hide all but the first scene in a block, indicating that there are other scenes with an indication such as " . . . " This allows viewing the script as one path that a user can take through the dialog. The prompt typically changes to "show alternative scene" when scenes have been hidden. The "hide alternative scenes" option may be available only after a scene heading has been designated as a block or random block.

For scenes within a random block, the option "use this scene as the first in the block when first visited" enables the script writer to ensure that an introductory scene in the block is always heard at least once by a caller. Similarly, for scenes within a random block, the option "always use this scene as the first in the block" enables the script writer to ensure that a scene is always heard by a caller when entering the block.

Of course, callers don't always respond to a prompt exactly as expected. For example, to indicate an affirmative response, the caller might say, "yes, "please" or "sure." A grammar can be designed to anticipate most of the common responses, but there are many variations—even in this simple case—and it would be inconvenient if all of the responses required an individual assignment of action when they fell into just two categories. Thus, grammars allow specification of all the ways to say "yes" as a sub-grammar, and when that grammar is matched, the system "tags" the output with that grammar category ("yes"). In the XML form of SRGS, a tag is delineated by opening and closing indicators: <tag>TAG-CONTENT</tag>. While the text of what was recognized is available, it may be easier to assign actions to tags.

The response line in a dialog that a script writer sees typically represents only one example of what could be said by the caller. A final specification for conversion to an interactive application, however, generally includes: a grammar specification with tags that will be associated with actions; specification of the action(s) to be taken in response to each unique tag; specifications of actions to be taken in the cases of "no response," "not understood," or prompt interrupt, if not a default action, which may be specified globally.

The system might maintain a collection of alternative wording that the user might use to indicate a particular response to a prompt. For example, in the illustrated table, the "alternative wording" column identifies different ways that the user might select the option "repeat." More particularly, according to the illustrated table, the user might select "repeat" by saying either "repeat", "what were the choices?", "go back", "please repeat" and "say again." Accordingly, if the user says "go back," in response to the prompt: "please select one of the following by saying it: choice 1, choice 2, or repeat," the system will assume that the user has selected the "repeat" choice.

The grammatical rules also may include ignoring certain words or phrases. For example, in some implementations, the grammatical rules include ignoring anytime the user says "uh" or "please." The writer need not specific such default operations built into the system.

In a typical implementation, there are grammatical rules associated with multiple responses. The rules can be used, for example, by a recognition engine to group the variety of ways in which the user might express a particular response. In the illustrated table, the grammatical rules that correspond to the "repeat" response are shown. The format of the illustrated rules is a simple list of possible ways in which the user might express his or her choice of the "repeat" response. In some implementations, the writer can create and/or edit the grammatical rules for various responses. In some implementations, grammatical rules are automatic and based, for example, on conventional grammar formulations.

In addition, a number of tools can be used to apply grammatical rules that use natural-language or other techniques. Some of these are provided by vendors such as Inference Corporation, of Australia. Such tools can be integrated into the system to facilitate grammatical rule management. In some implementations, the grammatical rules may be developed by multiple parties having various expertise.

The system enables 210 the script writer to enter additional lines of dialog while deferring providing the additional information for previously entered lines. Anytime after a line has been entered, the script writer can specify or change a line type and/or provide additional information for that line. Throughout the process, the system tracks 212 which lines still need to have line types specified and which of the additional information still has not been provided.

At any time, the script writer may instruct 216 the system to incorporate the lines of dialog that the script writer has entered into a caller interaction. A link may be provided at the script writer interface 118 to enable the script writer to so instruct.

In response to receiving such an instruction, the system determines 218 whether all line types have been assigned and whether, based on the assigned line types, all additional information has been provided for the entered lines.

If all of the needed information has been provided, the system responds by incorporating 220 the entered lines into an caller interaction. In some implementations, the lines are incorporated into a new stand-alone interactive user experience. In some implementations, the lines are incorporated into an existing set of dialog that already is being presented to callers as an interactive experience.

If the system determines that not all of the needed information has been provided, in response to the script writer's prompt (at 212), the system presents 222 the script writer with a listing of all the needed information that has not yet been provided, including any line types that need to be specified and any additional information that has not yet been provided. The system also check the entered lines for consistency and to check that the dialog is not likely to lead a caller into a dead end with no further options.

The system typically does not attempt to integrate the new lines into a user interactive dialog until all of the listed information has been provided. The listed information may be presented to the script writer in a number of ways, including by use of a simple list or lists, as a set of database entries or in other ways. The listing may include descriptive information to help the script writer fill in the information. The listing also may include suggestions to the script writer about how to fill in at least some of the additional information.

The system enables 224 the script writer to provide the information. Once all of the needed information has been provided, the system incorporates 220 the entered lines into an interactive user dialog.

In some implementations, the script writer can use the foregoing techniques to create dialog templates for a second script writer to use to create automated caller interactions. A simple use of such an application may be entertainment and self-expression, similar to the objectives of social networking web sites; however, there is no specific limitation to this purposes. The same functionality can be used to meet simple business or marketing goals.

FIG. 12 shows an example of a set 1200 of dialog lines that a first script writer might create using the foregoing techniques.

In the illustrated example certain words and phrases are designated (e.g., by bolding or italics) as being changeable by other script writers. For example, in the illustrated implementation, the italicized words and the bold word in the scene heading may be considered changeable by a second script writer. Accordingly, the second script writer may be able to call up the illustrated dialog for use in connection with a user-interaction and to change the italicized and bolded words and phrases. This allows the script template created by the first script writer to be easily adapted by the second script writer to the second script writer's specific purposes. This formulation allows the second writer to do much less work than the first, yet to personalize the script, a simple example being to enter their own jokes.

In some implementations, the second script writer interfaces with the system by starting with a dialog template and changing certain parts of the dialog template as desired. In some of those implementations, the second script writer also is given the ability to modify the underlying template (i.e., the part of the dialog not italicized or bolded). The permissible modifications typically are limited to those that don't change the basic structure of the sentence.

In some implementations, the system is further adapted to presents a script writer (or the second script writer) with a series of questions that a caller might ask. In those instances, the script writer may customize the dialog by providing spoken responses to those questions. Typically, the system will ask the second script writer to provide responses to questions that can be anticipated, such as "what's your name?", "what can you tell me about?" and "how was your day?" Responses can be entered as text to be read by a text-to-speech synthetic voice or can be recorded by the script writer or by an actor. If a response is entered as text for conversion by a text-to-speech engine, the script writer may be able to choose among several text-to-speech voices.

The second script writer may opt to decline using one or more of the questions presented. Also, after providing at least one answer to a question, the second script writer may be asked if he or she wishes to add alternative responses, which may be used, for example, if the caller asks the same question more than once, or may be used randomly (e.g., if specified by the first or second script writer).

Other statements can also be prompted and recorded by the second script writer for delivery to the caller, such as "hello," "that wasn't funny," "I don't agree" or "goodbye." These "one-liners" typically would be part of a larger dialog. The larger dialog may be created automatically when the second script writer answers a series of questions.

In some implementations, a script writer may utilize the foregoing techniques to create an expert persona that provides information or advice on a specific topic, such as nutrition. In such an implementation, the script writer might enter his or her own questions, such as "what foods contain Vitamin A?" and "what are the benefits of Vitamin A?" When the questions are fixed, the script writer can create a grammar that reflects variations on the way that the question is posed, but which are equivalent.

The Q&A approach is easily used when the question can be answered without further qualification. In some cases, the subject may be complex enough that the question requires qualification before providing an answer to avoid an overly long answer. This can be handled by adding an optional menu-based response, with specific responses created for each menu item or a not-understood response. For example, instead of answering the question, "Which foods contain Vitamin A?," directly, the system may first ask, "Are you a vegetarian?" The system can automatically remember the answer to such a question if designated by the writer, so that it need not be asked again.

In some implementations, a caller may make a statement that includes a certain key word. The key word could, in some implementations, cause the system to deliver a standard response. According to one convention, if a phrase is shown in the dialog in quotes, the exact phrase may be required. For example, a caller might define a subject Pets as defined by key words "pet," "dog," "dogs," "cocker spaniel," "cat," "puppy," "kitten," etc. When a word in the Pets subject is spoken, the system can then respond in context, with the response depending on the type of dialog that the application supports. In a humor application, for example, a pet joke might be in order.

The system allows key words to be used in the dialog as an abstract term. For example, if the script writer enters a response, "I like <Pets>. I have a pet snake myself. It likes to crawl in bed and sleep next to me, but that freaks my wife out." In this sentence, the prompt substitutes for <pets>"dogs" if the caller said "dog" or "dogs" and "cats" if the caller said "cat" or "cats."

The system may be adapted to recognize and properly treat plurals and singulars and other morphologically related words. The system can expand the speech recognition grammar appropriately if only singulars are included in the list, for example. In some implementations, the system compensates for obvious omissions in a list of keywords.

In addition, advanced keyword specifications can be implemented. Such advanced specifications can use Boolean logic (that is, OR, AND, and NOT).

Responses may be context-dependent, that is, different depending on the context of what has gone before. If, for example, a discussion is occurring about what makes a caller happy, the response can be about something cute a pet of the writer did. If the discussion is about responsibility, on the other hand, the application response might be more serious, about pet health, for example.

The system may enable the second script writer to combine various dialog "applets" into a complex dialog. Thus, one could combine a number of joke dialogs on specific subjects into a more complex humor dialog that reacts to the caller's responses. An example of a user-interface that enables a second script writer to incorporate dialog applets is shown in FIG. 13.

The illustrated table identifies an initial prompt and follow-up default prompts, associated modes of line delivery, key phrases and commands to go to specified dialog applets. The system can choose randomly among the two follow-up default prompts in the second line (and any others that may be added with a slash). A question such as "do you want more of the same?" may be treated as a yes-or-no type prompt, with a "yes" response causing the system to provide additional dialog on the same topic and a "no" response causing the system to deliver the initial prompt to the caller.

The mode of prompt creation (right hand box, first two lines) typically may be changed to a recording. The script writer may be able to access a pull-down menu that opens a dialog box where the writer can browse to an audio file that has been pre-recorded. Another option on the pull-down menu may be a text-to-speech voice other than the default voice.

If the cursor is positioned over Dialog_Applet_Name and right-clicked, a pull-down menu could offer the option of selecting from a list of applets that are collected in a database (e.g., database 112). Another pull-down option may be "add additional dialog applet." Selecting that option may cause the system to add another dialog applet to the list in the same box. The system may be adapted to choose randomly among the two (or more) applets. After all entries in a collection of follow-up default prompts have been delivered, in some implementations, the system may be adapted to deliver a prompt such as "I'm tired of this subject," and to replay the initial prompt.

A number of embodiments of the invention have been described. Nevertheless, it will be understood that various modifications may be made without departing from the spirit and scope of the invention.

For example, there are a variety of ways to represent grammars, such as SRGS (Speech Recognition Grammar Specification, from the W3C). Other standards, such as State Chart XML (SCXML, also from W3C) may be used as an application execution language.

Additionally, the use of automated speech technology does not exclude the use of operators/agents when it is appropriate to transfer a call to a person to complete a transaction. Such transfers may be supported by the system/call center. Similarly, the system may use hidden agents in the background to listen to the caller's response and chose a response for the system when it is having trouble. Other means of enhancing the performance of speech technology may be implemented as well.

Furthermore, the system and techniques may be used with "multimodal" technology, in which speech input or output is one component, but not the only component of the user interface. For example, a spoken request for information may be delivered as text to a mobile phone.

In some cases, certain parts of a dialog may be re-used in more than one place. Rather than re-write it each time, it can be referred to by a name with some standard notation to distinguish it as reusable dialog. Such dialogs may be designated as editable or locked, with locked dialogs editable only by someone, for example, with administrative privileges. "Special cases" may be one way in which reusable dialogs can be invoked. When inserted in a dialog, it maintains the flow of that dialog and inherits the voice of that dialog. In the script, the reusable dialog function can be invoked, for example, by inserting a command "call-scene scene-name." This can optionally be expanded into one example of the scene (one path taken through the called dialog). If this example is edited, it becomes a normal part of the script and is treated as if the reusable dialog were inserted in the script rather than called, and then edited.

A writer can go back and add or change structure in an existing script with a right-click on a line to obtain a pull-down menu. However, changing the wording or adding to a prompt or response generally does not require right clicking. If a cursor is placed within a prompt or response, any structure relating to that prompt is retained if it is edited. Similarly, if a paragraph is added to a prompt the structure of which has already been specified, the structure will be maintained, and no pop-up dialog is necessary to indicate that the new paragraph is a continuation.

If a script writer moves lines around in a dialog, the system may recognize if any inconsistencies are produced as a result of the move. Such inconsistencies may be indicated to the script writer.

In some implementations, if a caller can be identified as a previous caller by his or her phone number or by a log-in, the system may recall what the last scene presented to the caller was, and set the scene headings so that the caller will hear the next scene after the one last heard. This can be implemented, for example, by the random block previously described. This may be useful if the system is, for example, telling jokes and repetition is undesirable. This feature may require that all scene pointers be reset upon exit from a call so that the next caller is treated as a new caller.

In some implementations, a menu item at the script writer interface enables the script writer to view only scene headings for quick navigation or for an overview of the script. An "expand scene" option may be provided to expand a selected scene, and an "expand all" option to expand all scenes. A navigation pane, may be optionally displayed showing all block names. Clicking on one in the navigation pane will cause the document to display that point in the dialog.

According to certain embodiments, the system enables a script writer to generate example dialogs by randomly generating simulated user responses. Differing responses typically generate different paths through the alternatives in the script, but the result looks like a conventional linear script. The writer can review the script for prompts/responses that don't seem to work and thereby uncover problems with the dialog. Certain embodiments of the system enable the writer to click on any problem lines in the example script and be taken to another window where the source of the problem in the full script occurs. The writer may control other alternatives, for example by right-clicking; other alternatives might be, for example, to view other responses available to the caller at this point. There are at least two ways to do this: (1) generate the dialog directly from the script, in which case the grammars may not have yet been generalized, so only the default user response is used; or (2) using the expanded grammars from the VoiceXML code (and perhaps the generated VoiceXML code in its entirety). (There are VoiceXML simulators available commercially, but they may be associated with particular development systems.)

The option of generating dialogs directly from the script can typically make it easier to make context-responsive changes. The script writer can, for example, click on a sentence in the example dialog and be taken to the point in the script (in a separate window) that generated the example entry. This type of functionality is shared with a simulator feature that allows an evaluator to control the dialog flow.

During script creation, suspected common mistakes may cause the system to indicate a pop-up inquiry drawing the script writer's attention to the expected mistake.

Some embodiments of the system enable the script writer to check a script's consistency and completeness at any time by choosing a menu item. The writer can also be warned of incomplete or inconsistent entries when they attempt to submit a script for execution.

The script writer can, in some instances, affirmatively indicate that certain information is to be provided at a later time. This may be done, for example, by marking the information "to-be-done."

In some implementations, if a TTS-voice is not on a list of understood TTS names, the user may be prompted to change it or map it to a known name. Additionally, if a go-to command names an unspecified scene, the writer may be warned and perhaps presented with a selectable list of valid scene headings. There may be items other than unspecified items that cause inconsistencies. The system is adapted to check for these problems and warn the user accordingly, presenting options or suggestions where possible.

While it is expected that the dialog may frequently be too complex to be easily viewed as a graph, it could be useful to provide the option of reviewing the script in a graphical form. This option would automatically translate the dialog database into a graphical representation in a separate window. Clicking on a specific box or line would take the writer to the line in the script that generated that graphical element or the full prompt or grammar.

By invoking a menu command, prompts marked by a "record" command can be assembled by a menu option into a printable script in rich text format or word format. Any comments with the prompt also may be transferred. A name can be specified in the Record command. The script may be sorted and labeled by name if given, with recordings with no name assigned so labeled. Context may optionally be added by using a menu command "recording script with context" (or this can be a pop-up dialog box offering options).

Simulation of the dialog can use an actual telephone call or typed text entries, avoiding speech entirely to make the testing system independent of specific speech technology. Some implementations, make it possible to use a microphone attached to the script writer terminal if there is suitable speech recognition support. A VoIP telephone could be used. During simulation, it typically is possible to make dialog changes. Those changes typically are not implemented immediately, but can be batched and executed by a compile command. Typically, when a script writer selects an "edit" command or uses an equivalent command key during a simulation, the script writer is taken to a point in the script that is being executed. Once there, a "back" menu command (or equivalent command key) takes the system back one step in the script using the path that was tested.

Not all technical issues need be addressed by the script writer. For example, if the script writer delivers examples of what a caller might say that are to be considered equivalent, those examples can be expanded into a more complex grammar by an automated system or by personnel more acquainted with the technology. The grammar is not always expanded in terms of its representation; it may also be compacted where possible into a more concise representation of the same information. Thus, there may be separate processing whereby technology or technologists can support the creative writer. In such cases, there may be a mechanism whereby the script writer can view the implications of this expansion. One way would be to show examples of the implications of the expansions in sample dialogs, as discussed previously.

In some implementations, the system can provide the script writer insights on where expansion or modification of the dialog may be required. To do so, calls can be monitored, and responses not anticipated shown to the script writer in context of a dialog. The system can consolidate data collected during caller interactions into a report with audio files of what the caller said at different points in the dialog. This data may then be matched to the script. The writer can then, using a menu command, review responses to prompts and adjust the application and its grammars to handle unexpected responses or to correct errors in the original script.

The system may include a way to share the script remotely by multiple users, perhaps with permission to change limited to certain users. This could facilitate brainstorming or discussion, with changes by participants being visible to all during the discussion. It may be possible to do this with off-the-shelf collaborative software.

With a microphone connected to the PC, the user interface may also include voice commands as an option. The script writer can then say anything on the pull-down menu to have the same effect as selecting it with a mouse. This has the advantage of a script writer not having to take his or her hands off the keyboard. A voice control palette generally will float to the side of the main window or be in a separate window, displaying the usually controls for speech commands (mute button, etc.) and the speech commands available. Available commands may appear on a pull-down menu, along with indented sub-menus; the user may be able to jump down a level and say a unique command on a sub-menu with the effect of having sequentially selected the main level and then the sub-level command.

The information presented at the script writer interface and entered by the script writer are generally stored in the database. In some implementations, the database is implemented as a relational database, for example, MySQL.

The database typically has several parts. One part may be a prompt database, which contains the text of the prompts, the TTS voice to be used in speaking the prompt (if other than the current voice being used), an audio file (or address thereof) of the prompt if available, a flag indicating whether an audio file is available, whether this is a terminal prompt or concatenated to another prompt, and the next prompt to be spoken if the latter is the case. Another part may be a grammar database, which may include actual grammars, both pre-defined grammars and the grammars for the specific application, or a structure (such as a list) that allows building a grammar. Another part of the database contains the information describing the dialog. As one embodiment, each entry is a state of the dialog, often a prompt-response pair. Associated with the state is a reference to the prompt to be spoken, the grammar to be used in interpreting the spoken response, what the next state is given the response (as interpreted by tags in the grammar), data fields collected during the prompt (e.g., caller's name), and other control parameters (such as whether barge-in is enabled for that prompt). A state may have a mandatory transition without waiting for a response, in which case there would be no associated grammar and only one next state. Each entry in the database may have a control field to indicate special cases such as this. Another part of the database may be the a part to store data provided by the caller, perhaps identified with their telephone number or by a user id created, for example, in an enrollment process. This could be used temporarily during one call, or to retain information from call to call to avoid asking for it again.

Certain implementations of the system may provide a number of shortcuts to the script writer in navigating through various options. For example, the system may enable the script writer to right-click a response line and get a list of options, one of which is "add a caller response." This is a shortcut that allows a script writer to quickly add an alternative way of responding to the prompt. A separate window typically will pop up (with the name of the response provided at the top), allowing the writer to enter another equivalent phrase. The writer familiar with some grammar-writing conventions such as using parentheses for parts of phrases that are optionally spoken can enter examples in this form to reduce the number of examples typed. In this window, a side pane may list sub-grammars that have been defined. For example, all the variations of "yes" may be included in a YES grammar. (Caps are not required but are a useful visual convention.) The writer can simply type this name in caps to invoke all these variations or drag the sub-grammar into the desired spot. Examples of the sub-grammars can be viewed by double-clicking on them to open a new window (or possibly by a pop-up window when the cursor is moved over the entry). The full grammar definition can also be viewed in a new window by right clicking and selecting "full definition" or by selecting a full definition icon or menu item when the example window is open.

In some implementations, pre-defined grammars are special cases that the writer can use for common tasks, available as system resources, and reached by selecting "special cases" from a menu.

Storage of the script in a conventional database 112 represents challenges in that a database consists of independent entries and a script implies a time sequence. The branching nature of a dialogue may further complicate the representation, since the next line of dialog may depend on the response of the caller. Thus, independent entries in a database should contain information that allows reconstruction of these dependencies when the script is "published" (i.e., made available to callers, for example, by the delivery system in FIG. 1). Part of this objective can be accomplished by using a relational database system in which an entry in one database can refer to another database that contains a modifiable definition of that entry. For example, recorded prompts can be stored in a separate database from the database which references those prompts by a unique name that can be used to retrieve those recordings from the prompt database. Thus, if a prompt is re-recorded, the change is automatically used in the script and in the delivered application without a change in the main database describing the script.

In one embodiment, the possible entries in the main script database may include, for example, a root, a scene or a block.

A root generally is the record which initiates the dialog when the phone is answered. It typically contains a reference to the first database entry that is used to interact with the caller and it sets global information, such as the voice that will be used in a prompt if none is specifically specified. It may also specify an initialization event to be run (events are a type of database entry to be described), e.g., to identify the caller by caller ID or other means and/or to set selection parameters for randomized blocks (defined below) so that the caller will get different results (e.g., different jokes or stories) with each call. Other administrative fields are included, such as the author and date last updated.

A scene is a designated block of activity with a unique name, perhaps indicated in a script by a particularly formatted heading. For example, a scene may play a story without interaction or be interactive. A scene can be composed of more than one record, with each record having a scene name field indicating that the record is part of the particular scene.

Each scene in the database has a scene-entry record. Each scene is composed of a series of elements that are various types of records. Each element should have a unique number within the scene. This represents the order in which the elements are executed in a dialog. The element numbers can skip integers, since elements can be deleted after they are created. A scene record type is a specific type of record that heads the scene. Sequencing of elements of a scene is handled with a next-element field. The last element in the scene identifies the next scene to play and is identified with a last-element entry in a field. A scene can contain a scene. A scene is reusable, and the next-scene field in a scene element can be set dynamically during a call to allow returning to a point in a script or scene in which the scene was inserted. (A simple example of reuse is when a caller is not understood, which can occur more than once, of course.)

When a scene ends, the next scene is either explicitly indicated by a navigation command such as go-to, which includes a scene name or number or explicitly by another scene heading. An author will be required by the validation software before publishing to insert a scene heading if there is navigation to that scene from elsewhere and the scene has not yet been defined. The dialog development software creates placeholder scenes for certain types of prompts to make this process automatic for the writer.

A block is a series of scenes that are designated within a "block," the start of which is indicated in a script by a scene heading with the designation "(block)" after it. The end of a block can be explicitly indicated by a scene heading that is marked "(end block)" or implicitly by indenting; the next scene name at the same indentation as the block beginning is the end of the block. A block is distinguished from a single scene in that it invokes a special treatment of scenes within the block.

In a block, the same scene is not necessarily executed each time the block is entered. While the choice could be purely random, one option is to move down through a list and return to the top when it reaches the bottom of the list. This operation can be advantageous if the intent, for example, is to deliver a different joke each time the caller asks for a joke within a single call. If a scene is moved or deleted, the database is revised by the Dialog Application Software 110 to reflect this new sequence information.

When a block is exited, the block sequence number of all scenes within the block are compared to the block sequence number of the current scene, and the next-scene number in the block-entry record is set to that scene number. If no higher block sequence number is found, the next-scene entry is set to the lowest block sequence number for scenes in the block.

There are different types of scene records. These can include: prompt records, data collection records, menus, continue markers, events, comments, or command entries.

A prompt record may relate to an audio response from the computer. It typically can be used to elicit a response from the caller, e.g., by asking a question; or to provide instructions, entertainment, or information. It includes the text of the prompt, and, optionally, an audio file (with the intent that the audio be the spoken equivalent to the text), or a pointer to an audio file.

A data collection record typically relates to asking the caller for specific information in the prompt. The response should then be interpreted in terms of the information expected. The data collected is then typically used in later interactions. For example, the caller's location can be used to provide information on local businesses. Information collected can also be used in text-to-speech prompts: e.g., "What city in California do you live in?"

A menu item typically contains a list of items from which the caller is asked to select in a prompt, forming a prompt-response pair. There are typically several separate response records associated with a menu prompt.

A continue marker may in effect be a "null" scene. It just proceeds to the next scene, but can be useful as a marker or headline to make a script more readable.

An event scene calls an event defined by the software. It proceeds to the next scene as defined by the record after the event is executed. An event could, for example, increment a counter, the results of which may be stored in the event scene record. It could send a text message to a cell phone.

A comment may be arbitrary text denoted by particular formatting in the script (e.g., being included in parentheses and italicized), can be associated with any type of scene, and is used for display within the script as a parenthetical remark that, for example, may be used to remind the writer why a certain choice was made.

A command entry displayed in a script is generally on a separate line and looks like a comment. It is distinguished from a comment by the inclusion of reserved words. Examples of commands may include: (a) "go-to" followed by a scene name or number; (b) "invoke-scene" followed by a scene name or number (this command typically uses the named scene as if it were inserted in the script at that point); (c) "use-voice" followed by the name of a text-to-speech voice; and (d) "default" records that are stored to specify the handling of cases such as when the recognizer reports "no match," time-out, or barge-in (the caller interrupting a prompt).

"Say Anything" scenes may include, for example, a set of scenes (often just a single prompt) that have the characteristic that they are triggered at any time in the application by recognition of specific phrases. For example, the caller saying "Help" or "What can I say?" might trigger a list of available alternatives.

The particular implementation suggested allows very dynamic interaction, yet can be specified by independent, cross-referenced database entries. With this approach, the same database can be used to maintain the script and display it to the script writer and to generate the code used to implement the interaction with the caller.

Certain implementations may include interactions by human agents to support and/or supplement the system and functions disclosed herein. For example, in some implementations, the system may be adapted to transfer control of the caller interaction to a human agent if, for example, the caller is having trouble or if the automated system is not equipped to handle a particular request. Additionally, in some implementations, the system may include backing up automated speech recognition technology with human agents that don't come on the line, but listen to what the caller says and either types or selects interpretations of what the caller says from a pull-down list. The phrase "machine based" as used herein should not be construed to exclude participation of human agents in performing various roles.

The various processing/computer steps described herein may be performed by various processors, for example, in the scriptwriter's interface, the application server, or other external servers or computers. In general, the distribution of processing/computer functions across the various processors in the system may be handled in a manner that minimizes the possibility of overburdening any one processor and maximizes system speed and responsiveness.

Moreover, the term "call center" has been used to refer to the system(s) disclosed herein. That phrase should be construed broadly to include virtually any configuration of computer components that can be used to support speech-based caller interactions. It is not necessary that telephone lines actually be connected to the call center. Indeed, a large amount of processing may be done prior to a caller interaction being conducted.

Various features of the system can be implemented in hardware, software, or a combination of hardware and software. For example, some features of the system can be implemented in computer programs executing on programmable computers. Each program can be implemented in a high level procedural or object-oriented programming language to communicate with a computer system. Furthermore, each such computer program can be stored on a storage medium, such as memory readable by a general or special purpose programmable computer or processor, for configuring and operating the computer when the storage medium is read by the computer to perform functions described above.

Other implementations are within the scope of the claims.

What is claimed is:

1. A machine-implemented method comprising:

enabling a script writer to enter a line of dialog for use by a call center in a connection with a machine-implemented, speech-based, caller-interaction;

enabling the script writer to instruct that the dialog be incorporated in the caller-interaction;

tracking which of additional information has not yet been provided by the script writer;

prompting the script writer, in response to an instruction to incorporate the dialog, to provide any of the information that has not yet been provided:

assigning a line type to the line of dialog, wherein assigning the line type comprises either 1) analyzing contextual information or text formatting associated with the line of dialog, determining, based on the contextual information and text formatting, the line type to be assigned to the line, and assigning the determined line type to the line, or 2)

enabling the script writer to specify the line type anytime after entering the line, and assigning the specified line type to the line based on the script writer's specification, wherein enabling the script writer to specify the line type comprises providing the script writer an option to defer specifying line types for entered dialog and to enter additional lines of dialog instead;

determining, based on the assigned line type, the additional information to incorporate the line into the caller-interaction;

enabling the script writer to provide the additional information anytime after the line is entered; and enabling the script writer to enter additional lines of dialog while deferring providing the additional information.

2. The machine-based method of claim 1 where the line of dialog is automatically arranged and displayed on a computer monitor or in print in a format that looks much like a conventional play script.

3. The method of claim 1 further comprising: integrating the entered dialog into the caller-interaction if all of the information has been provided.

4. The machine-based method of claim 1 wherein the assigned line type is a scene heading that provides descriptive information about a scene in the dialog.

5. The machine-based method of claim 1 wherein the assigned line type is a prompt that includes dialog to be delivered by the call center.

6. The machine-based method of claim 1 wherein the assigned line type is a response that represents dialog that it is expected will be spoken by a user during the caller-interaction.

7. The machine-based method of claim 1 wherein the assigned line type is a command that includes instructions related to implementing the dialog.

8. The machine-based method of claim 1 wherein the information to incorporate the line into the caller-interaction comprises information necessary to incorporate the entered line into the caller-interaction.

9. The machine-based method of claim 1 further comprising:

providing an interface through which the script writer can enter the line of dialog and provide the information anytime after the line is entered.

10. A call center comprising:

an application server to support computer-implemented, speech-based, caller-interactions;

a database coupled to the application server to store data used by the application server;

dialog application software within the application server or on another connected server to convert at least a portion of the data stored in the database into a proper format to deliver the interaction to the caller; and a script writer interface with script writer supporting software coupled to the database and operable to enable a script writer to enter a line of dialog for use in a connection with the machine-implemented, speech-based, caller-interaction, wherein the script writer supporting software, when executed, is operable to enable the script writer interface to perform operations comprising:

enabling the script writer to instruct that the dialog be incorporated in the caller interaction;

tracking which of additional information has not yet been provided by the script writer;

prompting the script writer, in response to an instruction to incorporate the dialog, to provide any of the information that has not yet been provided:

assigning a line type to the line of dialog that the script writer enters, wherein assigning the line type comprises either 1) analyzing contextual information or text formatting associated with the line of dialog, determining, based on the contextual information and text formatting, the line type to be assigned to the line, and assigning the determined line type to the line, or 2) enabling the script writer to specify the line type anytime after entering the line, and assigning the specified line type to the line based on the script writer's specification, wherein enabling the script writer to specify the line type comprises providing the script writer an option to defer specifying line types for entered dialog and to enter additional lines of dialog instead; and identifying, based on the assigned line type, the additional information to incorporate the line of dialog into the caller-interaction, wherein the script writer interface is further operable to enable the script writer to provide the information anytime after the line is entered, and to enter additional lines of dialog while deferring providing the additional information.

11. The call center of claim 10 wherein the script writer supporting software of the call center is operable to enable the script writer interface to perform operations further comprising:

incorporating, in response to the script writer's instruction, the entered dialog into the caller-interaction when all necessary information has been provided.

12. The call center of claim 10 wherein the information to incorporate the line into the caller-interaction comprises information necessary to incorporate the entered line into the caller-interaction.

13. The call center of claim 10 wherein the data comprises information related to the machine-implemented, speech-based, caller-interactions.

14. The call center of claim 10 wherein the application server is connected to the database independently of the script writer interface, and wherein the script writer supporting software enables the script writer interface to perform operations comprising enabling the script writer to create database entries independently of the application server.

15. An article comprising a machine-readable memory storing machine-executable instructions that, when applied to a machine, causes the machine to:

enable a script writer to enter a line of dialog for use by a call center in a connection with a computer-implemented, speech-based, caller-interaction;

enable the script writer to instruct that the dialog be incorporated in the caller-interaction;

track which of additional information has not yet been provided by the script writer:

prompt the script writer, in response to an instruction to incorporate the dialog, to provide any of the information that has not yet been provided;

assign a line type to the line of dialog, wherein assigning the line type comprises either 1) analyzing contextual information or text formatting associated with the line of dialog, determining, based on the contextual information and text formatting, the line type to be assigned to the line, and assigning the determined line type to the line, or 2) enabling the script writer to specify the line type anytime after entering the line, and assigning the specified line type to the line based on the script writer's specification, wherein enabling the script writer to specify the line type comprises providing the script writer an option to defer specifying line types for entered dialog and to enter additional lines of dialog instead;

determine, based on the assigned line type, the additional information to incorporate the line into the caller-interaction; and enable the script writer to provide the additional information anytime after the line is entered and enter additional lines of dialog while deferring providing the additional information.

16. The article of claim 15 further comprising instructions to cause the machine to: integrate the entered dialog into the caller-interaction if all of the information has been provided.

* * * * *

UNITED STATES PATENT AND TRADEMARK OFFICE

CERTIFICATE OF CORRECTION

PATENT NO. : 8,503,665 B1
APPLICATION NO. : 12/105153
DATED : August 6, 2013
INVENTOR(S) : William S. Meisel It is certified that error appears in the above-identified patent and that said Letters Patent is hereby corrected as shown below:

In the Claims

Column 28, Line 3, in Claim 1, delete “provided:” and insert -- provided; --, therefor.

Column 29, Line 14, in Claim 10, delete “provided:” and insert -- provided; --, therefor.

Column 30, Line 19, in Claim 15, delete “writer:” and insert -- writer; --, therefor.

Signed and Sealed this
First Day of October, 2013

Teresa Stanek Rea
*Deputy Director of the United States Patent and Trademark Office*